UNITED STATES PATENT OFFICE.

GASTON DESCAMPS, OF HAVANA, CUBA.

PHOSPHORIC ACID WITH AN ABSORBENT.

SPECIFICATION forming part of Letters Patent No. 527,670, dated October 16, 1894.

Application filed May 22, 1894. Serial No. 512,113. (No specimens.)

*To all whom it may concern:*

Be it known that I, GASTON DESCAMPS, of Havana, Cuba, West Indies, have invented a new and useful Compound, of which the following is a full, clear, and exact description.

The object of the invention is to provide a new and improved article of manufacture, namely, phosphoric acid in dry form, and designed for use in the manufacture of sugar and in other industries, and capable of convenient transportation without deterioration, from place to place preparatory to using it.

The invention will be first described and then specifically claimed.

In order to prepare the compound I prefer to employ dry saw dust, cane bagasse, or other dry cellulose vegetable material, and capable of absorbing a phosphoric acid solution. The absorbing substance is preferably charged with a certain amount of pure phosphoric acid solution, and then dried, and then evenly charged with the pure phosphoric solution from time to time to increase the percentage of phosphoric acid in the absorbing material; which operation can be repeated without loss of acid, it being understood that phosphoric acid can be safely heated to about 1,290° Fahrenheit of temperature without loss.

A compound prepared in this manner can be readily transported from place to place, easily handled, and used in sugar houses for the discoloration of juices or for other purposes.

Having thus described my invention, I claim as new and desire to secure by Letters Patent—

As a new article of manufacture, a vegetable cellulose such as saw dust or cane bagasse dried and charged with phosphoric acid, substantially as described.

GASTON DESCAMPS.

Witnesses:
JOSEPH A. SPRINGER,
JORGE D. ALBERTINI.